Patented July 11, 1950

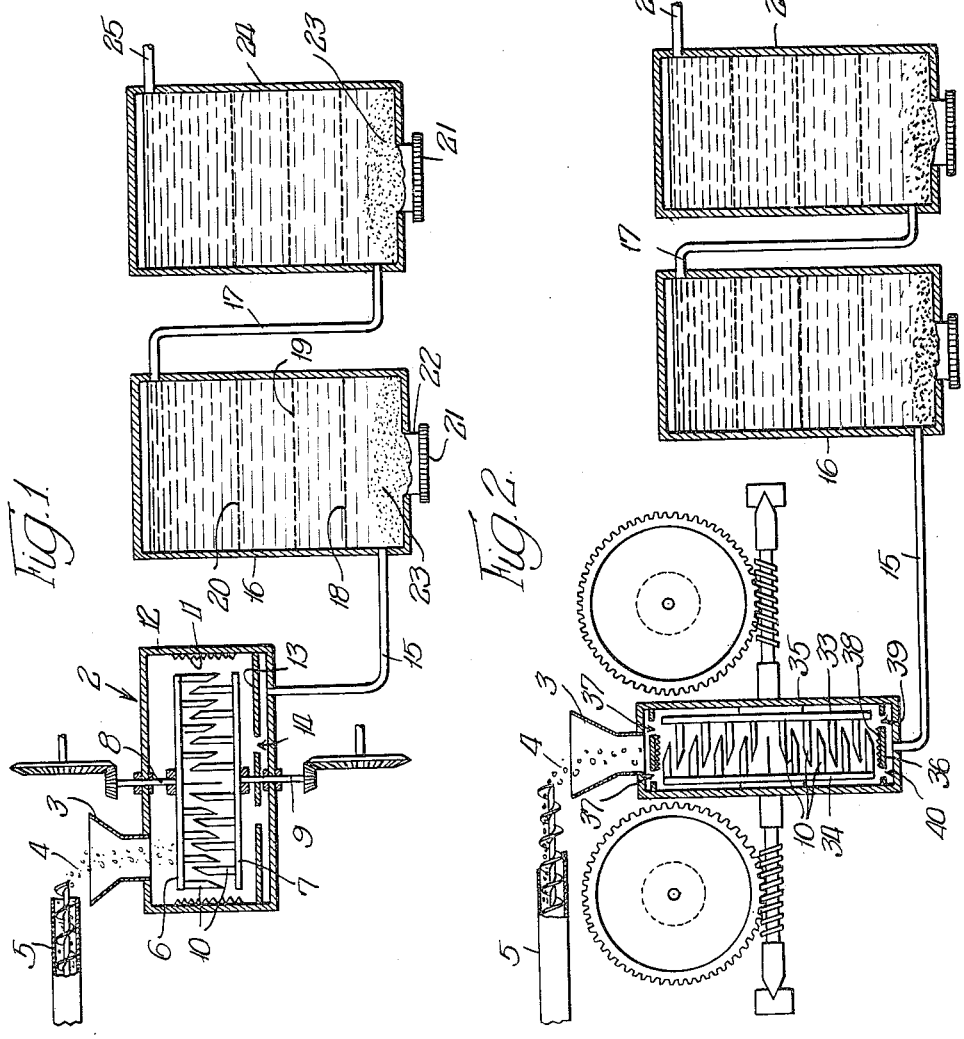

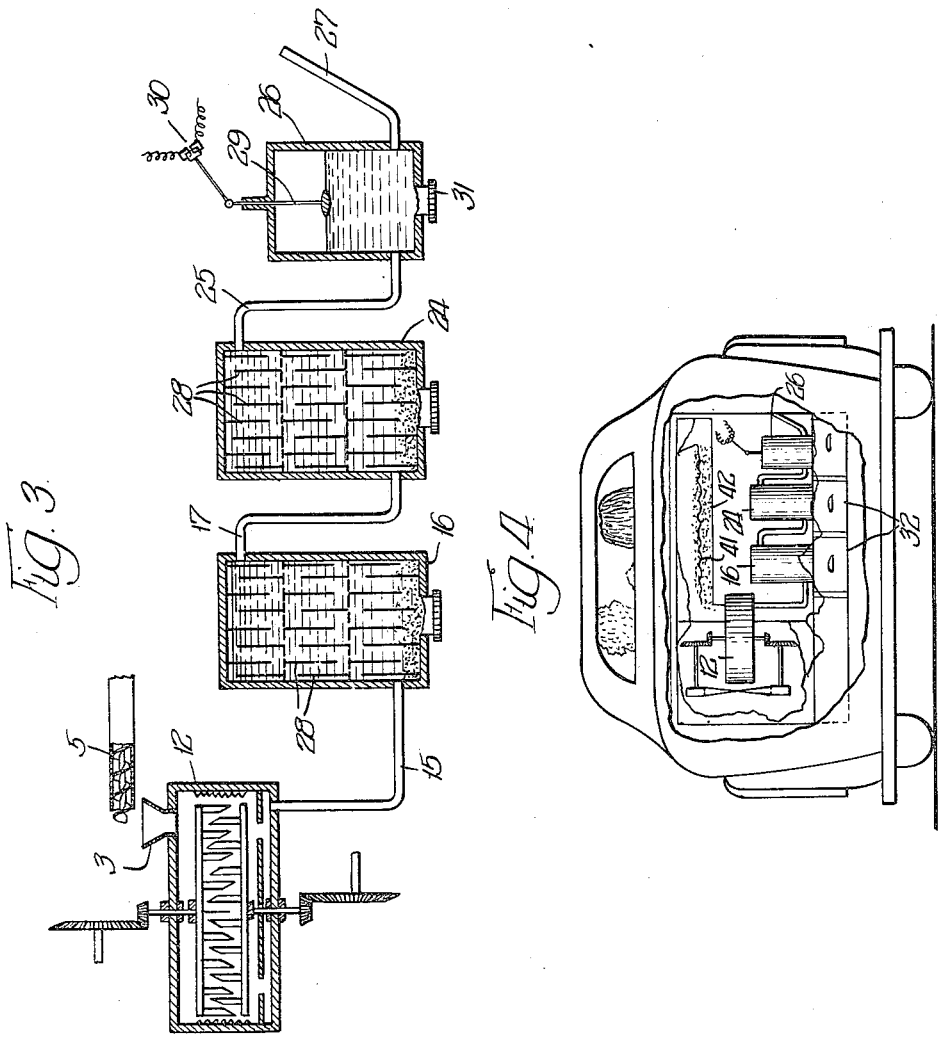

2,515,126

UNITED STATES PATENT OFFICE 2,515,126

PROCESS FOR EXTRACTING LIQUID HYDROCARBONS FROM SOLIDS AND APPARATUS THEREFOR

Jean Pathus Labour, Washington, D. C., assignor to The Gasoline Research Industrial & Commercial Company, Inc., Panama, Republic of Panama, a company of the Republic of Panama Application April 9, 1948, Serial No. 20,154
In France August 25, 1947

4 Claims. (Cl. 252—360)

This invention relates to a process for extracting liquid hydrocarbons from suitable solidified mediums, and apparatus therefor.

It is well known that liquid hydrocarbons, such as gasoline in particular, may be dispersed in a suitable aqueous colloid and subsequently congealed to form a solid mass or solid bodies with specified shapes and dimensions, such as spheres of relatively small diameter. Such a process has been disclosed in the French Patent No. 802,727, filed February 19, 1936, in the name of De Granville.

The products of such a process may be subjected to various forms of physical modification to recover the hydrocarbons dispersed therein.

It is an object of this invention to provide a process of recovering hydrocarbons which have been dispersed in the manner described by reducing the mass or individual particles of the solid medium by a shredding process which has the effect of separating the solid material and the liquid hydrocarbons so that a separable mixture of the two is formed.

It is a further object of the present invention to provide a process and apparatus for so recovering the liquid hydrocarbons which is relatively portable and therefore may be utilized in motor vehicles, aircraft, and the like.

It is another object of this invention to provide a process and apparatus for carrying out the separation of this mixture into its component parts so that the debris made up of the shredded solid medium is readily separated from the liquid hydrocarbons.

It is another object of this invention to provide a method and apparatus for recovering the dispersed hydrocarbons which are relatively simple and inexpensive, and which do not require the use of heavy pressure rollers or the like.

Further objects and advantages of this invention will become evident as the description proceeds, and from an examination of the accompanying drawing which illustrates one embodiment of the invention and in which similar numerals refer to similar parts throughout the several views.

In the drawings—

Figure 1 is a view in elevation and partly in cross-section of one form of the shredding, decanting and filtering apparatus which is the subject of this invention.

Figure 2 is a modified form of the shredding apparatus similar to that shown in Figure 1.

Figure 3 is a view in elevation, partly broken away, of the complete apparatus for recovering hydrocarbons dispersed in solid mediums.

Figure 4 is an end view in elevation, partly broken away, of a motor vehicle equipped with the apparatus shown in Figure 3.

Referring now to Figure 1, the apparatus for shredding the solid medium having the hydrocarbons dispersed therein includes a cylindrical housing 2 having a funnel-shaped opening 3 formed in the upper end thereof through which particles of the solid medium 4 are adapted to be fed into the housing 2 by the feeding device 5. The disc 6 and 7 are rotatably mounted within the housing 2 in parallel spaced relation to each other on the shafts 8 and 9 respectively, which are journaled in the top and bottom of the cylindrical housing 2. Each of these shafts is adapted to be rotated by a suitable gearing arrangement such as shown. The two discs 6 and 7 are adapted to be rotated in opposite directions and have the blades 10 extending from one side thereof in the direction of the other disc. The blades on each disc are so disposed that they extend into relationship with the blades carried by the other disc and are so positioned that they mesh with the latter blades but do not interfere with the free rotation of the discs. In addition, the blades 11 are disposed on the interior surface of the circular wall 12 of the housing 2 adjacent and between the peripheral edges of the two discs. These blades 11 may be of any suitable shape and operate to enlarge the effective shredding area within the housing 2. The false bottom 13 within the housing 2 has an annular opening 14 therein circumscribing the shaft 9. This opening allows the mixture of shredded solid medium and hydrocarbons to pass into the conduit 15 leading from the bottom of the housing 2 to the base of the first decanting chamber 16.

This chamber 16 is adapted to receive the mixture which is the product of the shredding mechanism and has an outlet tube 17 communicating therewith adjacent the top of the chamber. The filters 18, 19 and 20 are disposed within the chamber 16 in spaced relation to each other substantially parallel to the upper and lower ends of the chamber. Openings in the filter 18 are relatively large, but the openings in the remaining two filters become progressively smaller, so that material which will pass through the lower filters in an upward direction will be prevented from reaching the conduit 17 by the upper filter.

The base of the decanting chamber 16 has a cap 21 removably secured to the flange 22 which permits the removal of the solid material 23 which collects in the bottom of the chamber 16.

If desired, a second decanting chamber 24 substantially the same as the chamber 16 may be utilized. The conduit 17 communicates with the base of the chamber 24 in substantially the same fashion as the conduit 15 communicates with the chamber 16. The outlet conduit 25 is provided adjacent the top of the chamber 24 to permit the outward flow of hydrocarbons from the chamber 24.

As shown in Figures 3 and 4, the conduit 25 also communicates with a storage tank 26 which, in turn, has a conduit 27 leading therefrom which conveys the fuel to the engine or the like. In addition, it may be desirable, as shown in Figure 3, to utilize a system of baffles 28 in the decantation chambers 16 and 24, which decrease the effect of the movement of the vehicles or the like on the liquid within these chambers and therefore expedite the decantation-filtration process. It is also desirable, as shown in Figure 3, to have the level of the liquid in the storage chamber 26 control the operation of the feeding device 5 and the shredding mechanism contained in the housing 2. This control can be established by the use of a float and rod assembly 29 which, in turn, controls an electric switch mechanism 30.

To prevent the danger of inflammation of the liquid hydrocarbons when the solid medium is being shredded, the blades 10 are preferably made of non-heat-conducting material. In addition, the housing 2 may be cooled by any suitable means and, if necessary, a flow of air or of an inert gas such as nitrogen or carbon dioxide may be maintained in the housing. The flow of air or other gas will serve to prevent the vapor from reaching a concentration forming a combustible mixture. Means may be provided beneath the decanting chambers and the storage tank 26 to receive the material which gathers in the bottom of these containers when the caps 21 and 31 are removed. These may take the form of the drawers 32 shown in Figure 4.

As shown in Figure 2, the rotatable discs 33 and 34 may be mounted within the housing 35 to rotate in a substantially vertical plane. This requires a slightly modified form of housing in that the funnel-shaped inlet 3 is disposed at the uppermost portion of the cylindrical side of the housing 35 and the false side 36 is provided within the housing 35 in spaced relation to its cylindrical side. The portion of this false side adjacent the opening 3 has the openings 37 therein adapted to permit the particles of solid material 4 to flow into association with the blades 10. The blades 38 are disposed on the inner surface of the false side wall 36 adjacent and between the peripheral edges of the discs 33 and 34. The openings 39 and 40 are provided in the false wall 36 adjacent the lowermost portion of the cylindrical wall of the housing 35 and permit the mixture produced by the shredding mechanism to flow through the conduit 15 into the decanting chamber 16, substantially in the same fashion as shown in Figure 1. A modified form of driving mechanism for the discs 33 and 34 is shown which illustrates the statement above that any suitable method of driving these discs may be utilized.

The apparatus shown in detail in Figure 3 is shown installed in the rear of a motor vehicle in Figure 4. The solid material 41 containing the liquid fuel is stored in a suitable container 42 which is in communication with the opening 3 in the housing 2 and the fuel is fed into the latter through the medium of the feeding device 5, as shown in Figures 1 and 3. The extracted fuel flows through the conduit 27 to the engine of the vehicle and the solid waste material may be periodically removed by first depositing it in the manner previously described in the drawers 32 which are accessible through a door in the back of the vehicle similar to that which now is in common use on the luggage compartment of most automobiles. Although this type of installation would no doubt be suitable for land vehicles, it might be found desirable when installing such equipment in aircraft to provide gyroscopic means for producing a constant stabilization of the apparatus in regard to its orientation with the earth's surface. It would be necessary, of course, to provide suitable flexible coupling between the fuel storage tank and the engine if such a type of mounting were utilized. Other modifications obviously could be made to adapt the apparatus for still other types of installations, and applicants do not intend to be limited to these two forms of installation which have been outlined and disclosed, since they are merely given by way of example. By the same token, in the drawing and specification there has been set forth a preferred embodiment of the invention, and, although specific terms are employed, they are used in a generic and descriptive sense only and not for purpose of limitation, the scope of the invention being defined in the claims.

What is claimed is:

1. An apparatus for extracting liquid hydrocarbons dispersed in a suitable solid medium, comprising a shredding chamber, a pair of spaced, substantially parallel discs rotatably mounted in said chamber, a plurality of cutting blades disposed on opposing faces of said discs in intermeshing relation, at least one decanting chamber in communication with said shredder, filtering means in each decanting chamber, and a storage chamber for the decanted hydrocarbon, said storage chamber being in communication with said decanting chamber.

2. In an apparatus for extracting liquid hydrocarbons dispersed in suitable solid mediums, a mechanical shredder comprising a housing, a pair of spaced, substantially parallel discs, rotatably mounted within said housing, a plurality of cutting blades on said discs, said blades being so disposed as to move in meshed relationship with each other when said discs are rotated, means for introducing a solid medium into said housing and means for permitting the mixture produced by said shredder to be removed therefrom.

3. In an apparatus for extracting liquid hydrocarbons dispersed in suitable solid mediums, a mechanical shredder comprising a housing, spaced rotatable discs rotatably mounted in said housing, a plurality of cutting blades protruding from opposed faces of said discs, the cutting blades of one disc extending into intermeshing relation with the blades of another, a plurality of stationary blades disposed adjacent to the peripheral edges of said discs, means for introducing said solid mediums into said housing, and means for permitting the mixture produced by said shredder to be removed therefrom.

4. An apparatus for extracting liquid hydrocarbons dispersed in a suitable solid medium, comprising a shredding chamber, a pair of substantially parallel, spaced rotatable discs disposed in said shredding chamber, a plurality of cutting blades disposed on opposing faces of said discs, the blades of one disc extending into intermeshing relation with the blades of another, a plurality of stationary cutting blades disposed on one of the interior walls of said shredding chamber adjacent to the peripheral edges of said discs, means for rotating said discs in opposite directions, at least one decanting chamber in communication with said shredding chamber, filtering means in each decanting chamber and a storage chamber for the decanted hydrocarbons, said storage chamber being in communication with said decanting chamber.

JEAN PATHUS LABOUR.

REFERENCES CITED

The following references are of record in the file of this patent:

UNITED STATES PATENTS

| Number | Name | Date |
| --- | --- | --- |
| 61,463 | Robertson | Jan. 22, 1867 |
| 144,830 | Carr | Nov. 25, 1867 |
| 2,302,430 | Dons et al. | Nov. 17, 1942 |
| 2,323,056 | Labour | June 29, 1943 |
| 2,374,456 | Ravndal et al. | Apr. 24, 1945 |

FOREIGN PATENTS

| Number | Country | Date |
| --- | --- | --- |
| 59,619 | Norway | July 18, 1938 |
| 553,501 | Great Britain | May 25, 1943 |